United States Patent
Kuntz et al.

(10) Patent No.: US 12,435,998 B2
(45) Date of Patent: Oct. 7, 2025

(54) DISPLACEMENT SENSOR ARRANGEMENT FOR DETERMINING THE POSITION OF A BODY MOVING ALONG A MOVEMENT PATH IN A VEHICLE

(71) Applicant: Robert Bosch GmbH, Stuttgart (DE)

(72) Inventors: Stefan Kuntz, Flein (DE); Jonathan Haaf, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 287 days.

(21) Appl. No.: 18/329,389

(22) Filed: Jun. 5, 2023

(65) Prior Publication Data

US 2024/0019271 A1 Jan. 18, 2024

(30) Foreign Application Priority Data

Jul. 18, 2022 (DE) .................... 10 2022 207 282.0

(51) Int. Cl.
| | |
|---|---|
| G01D 5/14 | (2006.01) |
| B60T 7/06 | (2006.01) |
| G01B 7/02 | (2006.01) |

(52) U.S. Cl.
CPC ............. *G01D 5/145* (2013.01); *B60T 7/06* (2013.01); *G01B 7/02* (2013.01)

(58) Field of Classification Search
CPC .. G01D 5/02; G01D 5/145; B60T 7/06; B60T 7/042; G01B 7/02; G01B 7/003
See application file for complete search history.

(56) References Cited

U.S. PATENT DOCUMENTS

| | | | |
|---|---|---|---|
| 2022/0055582 A1* | 2/2022 | Takimoto | G01R 33/072 |
| 2023/0077951 A1* | 3/2023 | Moriya | G01D 5/145 |
| | | | 324/207.24 |

FOREIGN PATENT DOCUMENTS

DE  10 2008 006 238 A1  8/2008

* cited by examiner

*Primary Examiner* — Son T Le
(74) *Attorney, Agent, or Firm* — Maginot, Moore & Beck LLP

(57) ABSTRACT

A displacement sensor arrangement includes a magnet, a magnetic angle sensor, and a flux density sensor. The magnet is configured to generate, at least over a path of a moving body, a magnetic field having at least two mutually perpendicular components, one of which is perpendicular to the movement path. The magnetic angle sensor is sensitive to at least two of the at least two mutually perpendicular components of the generated magnetic field. The magnetic angle sensor is configured to span at least one measuring plane and to determine a current position of the moving body on the movement path as a function of respective value pairs of the at least two mutually perpendicular components. The flux density sensor is configured to detect an instantaneous value of one of the at least two mutually perpendicular components.

15 Claims, 2 Drawing Sheets

DISPLACEMENT SENSOR ARRANGEMENT FOR DETERMINING THE POSITION OF A BODY MOVING ALONG A MOVEMENT PATH IN A VEHICLE

This application claims priority under 35 U.S.C. § 119 to patent application no. 10 2022 207 282.0, filed on Jul. 18, 2022 in Germany, the disclosure of which is incorporated herein by reference in its entirety.

The disclosure relates to a displacement sensor arrangement for determining the position of a body moving along a movement path in a vehicle. It is also an object of the present disclosure to provide a vehicle having such a displacement sensor arrangement for determining the position of a brake pedal.

BACKGROUND

In the prior art, magnetic linear displacement sensors evaluate the magnetic angle of the flux density vector in a two-dimensional plane to detect a pedal displacement of a pedal, in particular of a brake pedal in a vehicle. Using suitable transformation methods, the magnetic angle is converted into a linear output signal representing the pedal displacement. Due to the high power consumption of the evaluation and control circuits available on the market, which are usually designed as ASICs (application-specific integrated circuits), a wake-up function is used to wake up the system from a sleep state.

A magnetic sensor for determining the position of a body in motion moving along a path is known from DE 10 2008 006 238 A1. The sensor comprises generating means ensuring the generation of a magnetic induction with two mutually perpendicular components, one of which is perpendicular to the path, and measuring means sensitive to the two mutually perpendicular components of magnetic induction and determining the position of the body in motion as a function of the induction value pairs of the two components. The means for generating magnetic induction comprises at least two magnets whose magnetic axes have opposite directions while extending in the same linear direction that is parallel to the linear path or touches the circular path.

SUMMARY

The displacement sensor arrangement for determining the position of a body moving along a movement path in a vehicle with the features of the disclosure has the advantage that a switching function or activation function dependent on the movement path can be implemented at a specifiable switching point by the second measuring means on the basis of the magnetic flux density. In an advantageous manner, a common alignment of the first and second measuring means of the displacement sensor arrangement can optimize a course of the measured magnetic field over the movement path in such a way that the switching point is located at the desired or specified position and is no longer reached even in the case of long movement paths.

Embodiments of the displacement sensor arrangement according to the disclosure can be used, for example, for a brake pedal of a vehicle which is coupled to the moving body, wherein the pedal displacement of the brake pedal specifies the movement path of the moving body. The switching function or activation function can represent, for example, a wake-up function and/or a brake light function, which can be activated by the brake pedal at the specified switching point. For example, the wake-up function allows the electrical systems of the corresponding vehicle to be activated simply by pressing the brake pedal. The brake light function can be used, for example, as a fallback solution for activating the brake light to indicate a manually triggered braking process. By the common alignment of the first and second measuring means of the displacement sensor arrangement, the position of the switching point can be simply adapted to different requirements. This allows both the wake-up function for activating the vehicle systems and the brake light function to be implemented since the brake light remains activated even during long movement paths or pedal displacements of the brake pedal and does not go out again. Thus, the realization of the wake-up function and of the brake light function can be implemented with only one conventional magnetic switching element, which allows significant cost savings.

Embodiments of the present disclosure provide a displacement sensor arrangement for determining the position of a body moving along a movement path in a vehicle, comprising generating means designed to generate, at least over a path of the moving body, a magnetic field having at least two mutually perpendicular components, one of which is perpendicular to the movement path; first measuring means which are sensitive to at least two of the mutually perpendicular components of the generated magnetic field and are designed to span at least one measuring plane and to determine the position of the moving body on its movement path as a function of value pairs of two of the mutually perpendicular components; and second measuring means which are designed to detect an instantaneous value of one of the at least two mutually perpendicular components and to compare it with a threshold value in order to determine a switching point. The generating means or the measuring means are intended to be connected to the moving body in order to move relative to one another. Here, the switching point is defined by a common alignment of the first measuring means and the second measuring means with respect to the movement path.

In addition, a vehicle with a braking system comprising a brake pedal is proposed. Here, a position of the brake pedal is determined by such a displacement sensor arrangement.

In the following, the first measuring means is understood to mean a measuring device with at least one measuring element, which is designed to be sensitive in at least two mutually perpendicular measuring directions. Preferably, the first measuring means comprise at least two measuring elements which are arranged in a common component and are each designed to be sensitive in a preferred measuring direction, the preferred measuring directions of the various measuring elements being perpendicular to one another. The measuring directions of at least two measuring elements can span a common measuring plane or be arranged in mutually shifted measuring planes whose normals are parallel to one another. In addition, for each of the mutually perpendicular components of the magnetic field to be detected, the first measuring means can have two measuring elements which are arranged in the same spatial direction at a distance from one another.

In the following, the second measuring means is understood to be a measuring device with at least one measuring element which is designed to be sensitive in a preferred measuring direction.

Advantageous improvements to the displacement sensor arrangement indicated in the disclosure and to the vehicle indicated in the disclosure are possible by the measures and developments listed in the disclosure.

It is particularly advantageous that the measuring means can be arranged on a common circuit carrier and/or in a common component housing. Here, the common circuit carrier and/or the common component housing can be designed to be rotatable about an axis which corresponds to a normal of the at least one measuring plane of the first measuring means. This advantageously allows a simple shifting of the switching point by a mechanical tilting or rotation of the common circuit carrier and/or of the common component housing. Usually, the measuring means are aligned and fixed parallel to the surface of the generating means, wherein this specified position cannot be changed due to the mechanical design of the conventional systems. Due to the possible mechanical tilting or rotation of the common circuit carrier and/or the common component housing with respect to the movement path, the switching point can be optimally adjusted as a function of the tilt angle or rotation angle according to customer requirements. By tilting or rotating by positive angles, the possible switching point moves toward smaller paths.

In an advantageous embodiment of the displacement sensor arrangement, a rotational position of the common circuit carrier and/or of the common component housing with respect to the movement path can be determined in advance to define the switching point. This can be carried out for a specified system design by, for example, using a simulation and/or a test setup. Preferably, the switching threshold can still be individually calibrated at the end of the production line in order to minimize the influence of installation tolerances on the switching point.

In a further advantageous embodiment of the displacement sensor arrangement, the at least two mutually perpendicular components of the individual value pairs can each be determined differentially from two measured values, which can be detected by two measuring elements of the first measuring means that are spaced apart from one another spatially in the same spatial direction. This differential detection of the at least two mutually perpendicular components enables a noise field robust detection of the components of the magnetic field.

In a further advantageous embodiment of the displacement sensor arrangement, the first measuring means can comprise a magnetic angle sensor which is sensitive to the at least two mutually perpendicular components of the magnetic field, and a first evaluation and control unit which is designed to receive output signals from the magnetic angle sensor, to convert them into corresponding magnetic angle values and to determine a position of the body in motion for each magnetic angle value. Here, measured values of a first component of the magnetic field may represent sine values of the magnetic angle and measured values of a second component of the magnetic field may represent cosine values of the magnetic angle. The magnetic angle sensor is preferably designed as a Hall sensor with at least two detection directions. The determination of the current position of the moving body can preferably be based on an arc tangent function or an approximated arc tangent function of the two mutually perpendicular components. The approximated arc tangent function preferably corresponds to a linearized arc tangent function.

In a further advantageous embodiment of the displacement sensor arrangement, the second measuring means can comprise a flux density sensor which is sensitive to one of the at least two mutually perpendicular components of the magnetic field and is designed to detect the instantaneous value of an effective flux density, and a second evaluation and control unit which is designed to compare the instantaneous value of the effective flux density with the threshold value and to determine whether the specified switching point has been reached. Here, the second evaluation and control unit can be further designed to output at least one activation signal when the specified switching point is reached. For example, a first activation signal can be intended to activate, as a wake-up signal, at least the first evaluation and control unit. Of course, further electrical or electronic systems can also be activated or woken up by appropriate activation signals. For example, a second activation signal may be intended to activate a brake light function of the vehicle. The flux density sensor is preferably designed as a Hall sensor with a detection direction.

In the present document, the first evaluation and control unit and the second evaluation and control unit can be understood as electrical assemblies or electrical circuits that can process or evaluate detected sensor signals. The evaluation and control units can each have at least one interface, which can be formed by hardware and/or software. In a hardware-based design, the interfaces can, for example, be part of a so-called system ASIC, which contains the most diverse functions of the individual evaluation and control units. However, it is also possible that the interfaces are separate integrated circuits or consist at least in part of discrete components. In a software-based design, the interfaces can be software modules that are present on a microcontroller alongside other software modules, for example. It is also advantageous to have a computer program product with program code that is stored on a machine-readable carrier, such as a semiconductor memory, a hard disk memory or an optical memory and is used to perform the evaluation when the program is executed by the first evaluation and control unit and/or by the second evaluation and control unit and/or by a higher-level control device.

In a further, advantageous embodiment of the displacement sensor arrangement, the movement path can, for example, specify a linear movement or a circular movement of the moving body.

In a further, advantageous embodiment of the displacement sensor arrangement, the generating means may comprise at least two magnets whose magnetic axes have opposite directions. Here, at least two magnets can extend in the same direction, which is parallel to the linear motion path or touches the circular movement path. The magnets may be arranged at a distance from one another along the linear movement path or along the direction touching the circular movement path. Such an embodiment of the generating means, in combination with a magnetic angle sensor, is particularly well suited for determining the position of a body on a movement path. Alternatively, the generating means may comprise at least one magnet with a special magnetization, such as a surface magnetization or a helical magnetization, in order to generate the magnetic field with at least two mutually perpendicular components.

An exemplary embodiment of the disclosure is shown in the drawings and is explained in more detail in the following description. In the drawings, identical reference signs indicate components or elements that perform identical or analogous functions.

DETAILED DESCRIPTION

Figure 1:
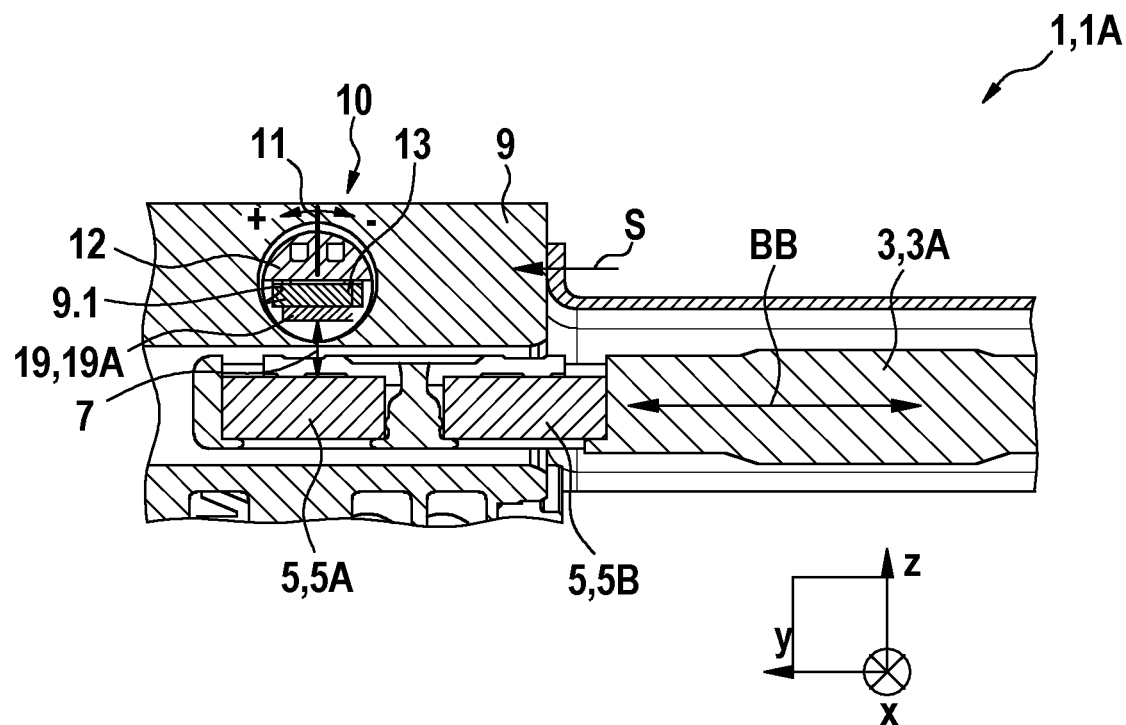
FIG. 1 shows a schematic representation of an exemplary embodiment of a displacement sensor arrangement according to the disclosure for determining the position of a body moving along a movement path in a vehicle.
Figure 2:
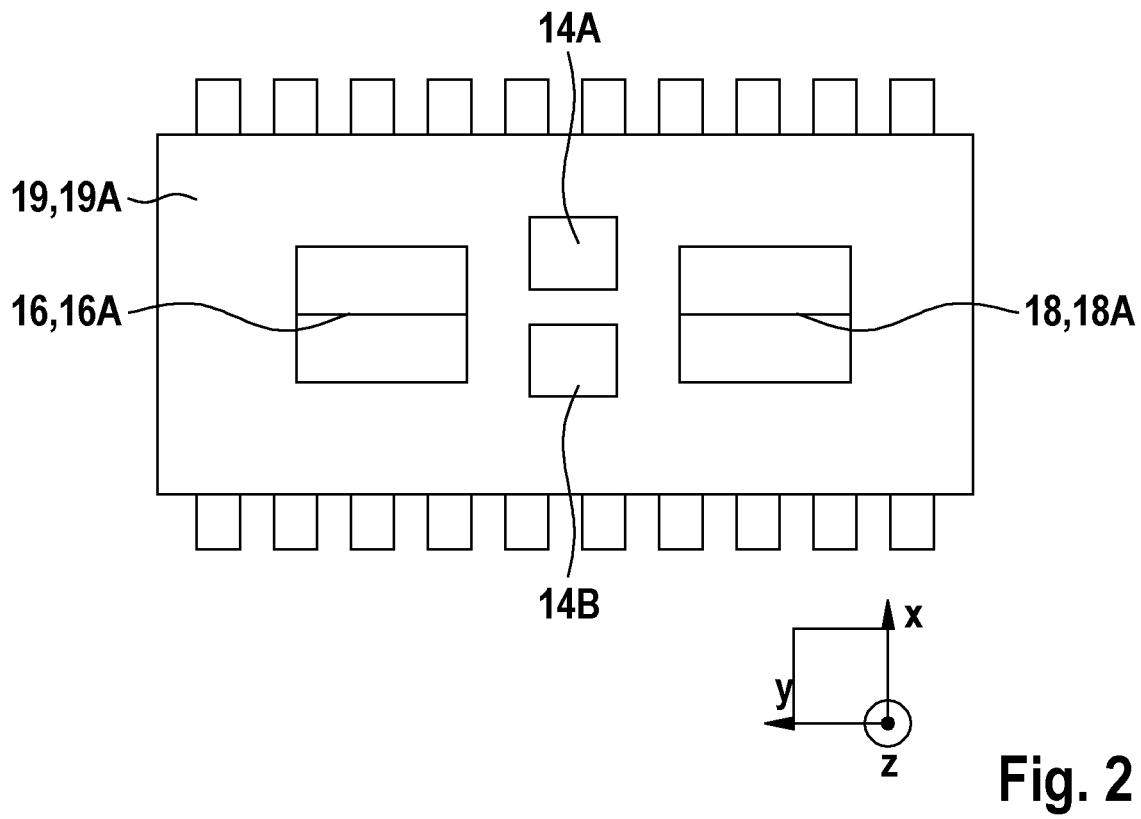
FIG. 2 shows a schematic representation of an exemplary embodiment of an electronic component for the displacement sensor arrangement according to the disclosure of FIG. 1.
Figure 3:
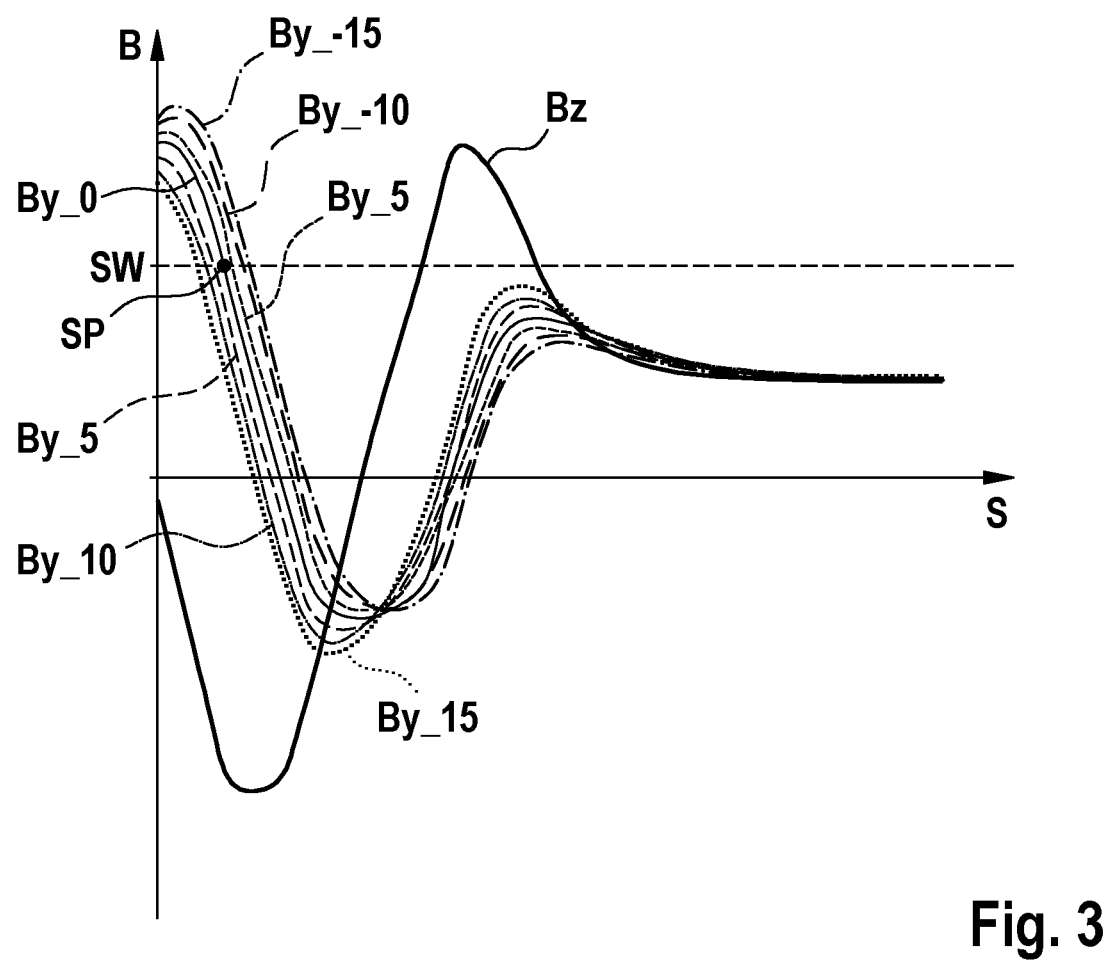
FIG. 3 shows a flux density-distance characteristic diagram with different magnetic flux density curves as a function of the distance covered by the moving body of FIG. 1.

As can be seen from FIGS. 1 through 3, the illustrated exemplary embodiment of a displacement sensor arrangement 1 according to the disclosure for determining the position of a body 3 moving along a movement path BB in a vehicle comprises generating means 5 which, at least over a path of the moving body 3, generate a magnetic field having at least two mutually perpendicular components Bx, By, Bz, one of which is perpendicular to the movement path BB; first measuring means 16 which are sensitive to at least two of the mutually perpendicular components By, Bz of the generated magnetic field, span at least one measuring plane and determine the position of the moving body 3 on its movement path BB as a function of value pairs of two of the mutually perpendicular components By, Bz; and second measuring means 18 which detect an instantaneous value of one of the at least two mutually perpendicular components Bx, By, Bz and compare it with a threshold value SW in order to determine a switching point SP. The generating means 5 or the measuring means 16, 18 are intended to be connected to the moving body 3 in order to move relative to one another. Here, the switching point SP is defined by a common alignment of the first measuring means 16 and the second measuring means 18 with respect to the movement path BB.

In the illustrated exemplary embodiment, the movable body 3 corresponds to a piston 3A, which is coupled to a brake pedal of a braking system of the vehicle, which is not shown in detail. In the exemplary embodiment shown, the movement path BB specifies a linear movement of the piston 3A, which is mounted for sliding movement in a hydraulic unit 9 of the braking system. Here, S corresponds to a covered distance of the piston 3A, which corresponds to a pedal displacement of the brake pedal.

As can be further seen from FIG. 1, the generating means 5 have two magnets 5A, 5B whose magnetic axes have opposite directions. In the illustrated exemplary embodiment, the two magnets 5A, 5B of the generating means 5 are arranged in the piston 3A and extend in the same linear direction, which is parallel to the linear movement path BB. The effective surface of the two magnets 5A, 5B shown lies in an x-y plane. The magnets 5A, 5B have a specified distance to one another along the linear movement path BB or in the longitudinal direction y.

In an alternative exemplary embodiment of the displacement sensor arrangement 1, which is not shown, the movement path BB specifies a circular movement of the moving body 3. In this alternative exemplary embodiment, the two magnets 5A, 5B extend in the same linear direction, which touches the circular movement path. The magnets 5A, 5B have a specified distance from one another along the direction touching the circular movement path.

As can also be seen from FIGS. 1 and 2, the measuring means 16, 18 are part of a sensor unit 10, the cylindrical housing 12 of which is arranged in a receiving bore 9.1 of the hydraulic unit 9 of the vehicle braking system. As can be seen in particular in FIG. 2, the first measuring means 16 and the second measuring means 18 are arranged in a common component housing 19A of an electronic component 19, which is designed here as an application-specific integrated circuit (ASIC) and is arranged on a circuit carrier 13. The receiving bore 9.1 is made in the hydraulic unit 9 in such a way that an air gap 7 with a specified height is formed between the common component housing 19A and the magnets 5A, 5B of the generating means 5. As can also be seen in FIG. 2, the first measuring means 16 comprise a magnetic angle sensor 16A, which in the illustrated exemplary embodiment is sensitive to a first component By of the magnetic field extending in the longitudinal direction y and to a second component of the magnetic field extending in the vertical direction z, the first and second components By, Bz extending perpendicularly to one another. In addition, the first measuring means 16 comprise a first evaluation and control unit 14A, which receives output signals of the magnetic angle sensor 16A, converts them into corresponding magnetic angle values, and determines a position of the body 3 in motion for each magnetic angle value along path S. In the illustrated exemplary embodiment, the measured values of the first component By of the magnetic field represent sine values of the magnetic angle and the measured values of the second component Bz of the magnetic field represent cosine values of the magnetic angle. In the illustration, the determination of the current position of the moving body 3 is based on a linearized arc tangent function of the two mutually perpendicular components Bz, By. In the exemplary embodiment shown, the second measuring means 18 comprise a flux density sensor 18A, which is sensitive to one of the at least two mutually perpendicular components By, Bz of the magnetic field, detects the instantaneous value of an effective flux density which corresponds to the first component By of the magnetic field in the longitudinal direction y, and a second evaluation and control unit 14B, which compares the instantaneous value of the effective flux density or of the first component By with the threshold value SW and determines whether the specified switching point SP has been reached. In addition, the second evaluation and control unit 14B outputs at least one activation signal when the specified switching point SP is reached. In the illustrated exemplary embodiment, the second evaluation and control unit 14B outputs a first activation signal as a wake-up signal in order to activate at least the first evaluation and control unit 14A. Of course, further electrical or electronic systems can also be activated or woken up by appropriate activation signals. In addition, the second evaluation and control unit 14B outputs a second activation signal that activates a brake light function of the vehicle.

In the illustrated exemplary embodiment, the magnetic angle sensor 16A and the first evaluation and control unit 14A as well as the flux density sensor 18A and the second evaluation and control unit 14B are formed in the common electronic component 19 and arranged in the common component housing 19A, which is preferably designed as a mold housing. Alternatively, the magnetic angle sensor 16A and the first evaluation and control unit 14A may be formed in a first electronic component and arranged in a first component housing, and the flux density sensor 18A and the second evaluation and control unit 14B may be formed in a second electronic component and arranged in a second component housing. Furthermore, the first electronic component and the second electronic component may be arranged in a common component housing. As a further alternative, the two evaluation and control units 14A, 14B may be arranged outside the common component housing 19A on the printed circuit board 13.

As can also be seen in FIG. 2, the magnetic angle sensor 16A and the flux density sensor 18A are arranged side by side in the longitudinal direction y at a distance. In an alternative exemplary embodiment not shown, the magnetic angle sensor 16A and the flux density sensor 18A are arranged side by side in the transverse direction x at a distance.

In an alternative exemplary embodiment of the displacement sensor arrangement 1 not shown, the two mutually perpendicular components Bz, By of the individual value pairs are each determined differentially from two measured values. This means that two measuring elements of the first measuring means 16 spaced apart from one another spatially in the same spatial direction each detect two measured values, from which the corresponding measured value is then determined by difference formation.

Referring to FIGS. 1 and 3, the joint alignment process of the first measuring means 16 and of the second measuring means 18 is described below. In the illustrated exemplary embodiment, the circuit carrier 13 is connected to the housing 12 of the sensor unit 10 in a rotationally fixed manner. Thus, the common circuit carrier 13 and the common component housing 19A can be rotated with the housing 12 of the sensor unit 10 about an axis of rotation corresponding to a normal of the at least one measuring plane of the first measurement means 16. In the exemplary embodiment shown, the axis of rotation extends in the transverse direction x. Here, in the illustrated exemplary embodiment, a rotational position of the housing 12 of the sensor unit 10 with the common circuit carrier 13 and the common component housing 19A with respect to the movement path BB for defining the switching point is determined in advance by simulation. In order to illustrate the joint alignment process of the first measuring means 16 and of the second measuring means 18, FIG. 1 shows a needle-shaped position indicator 11, which can be tilted or rotated in a positive direction (+) or in a negative direction (−). In FIG. 3, a characteristic curve Bz of the magnetic flux density in the vertical direction z, which corresponds to the second component of the magnetic field, is shown for information only. For the flux density By extending in the longitudinal direction y or along the movement path BB and corresponding to the second component of the magnetic field, several characteristic curves By_0, By_5, By_10, By_15, By_−5, By_−10, By_−15 are shown as a function of the tilt angle of the sensor unit 10 or of the sensor housing 12. Depending on the tilt angle, the switching point SP can be adjusted according to customer requirements. Here, a solid characteristic curve By_0 shows the course of the flux density in the longitudinal direction y or along the movement path BB at a tilt angle of 0°. The corresponding intersection point with the threshold value is shown as switching point SP. A dashed characteristic curve By_5 shows the course of the flux density in the longitudinal direction y or along the movement path BB at a tilt angle of 5° in the counterclockwise direction. A dash-dotted characteristic curve By_10 shows the course of the flux density in the longitudinal direction y or along the movement path BB at a tilt angle of 10° in the counterclockwise direction. A dotted characteristic curve By_15 shows the course of the flux density in the longitudinal direction y or along the movement path BB at a tilting angle of 15° in the counterclockwise direction. Due to the tilting by positive angles in the counterclockwise direction, the possible switching point moves to shorter paths S due to the shift of the course of the flux density in the longitudinal direction y or along the movement path BB. A short-dashed characteristic curve By_−5 shows the course of the flux density in longitudinal direction y or along the movement path BB at a tilting angle of −5° clockwise. A long-dashed characteristic curve By_−10 shows the course of the flux density in the longitudinal direction y or along the movement path BB at a tilt angle of −10° clockwise. A long-dash-dotted characteristic curve By_−15 shows the course of the flux density in the longitudinal direction y or along the movement path BB at a tilt angle of −15° clockwise. Due to the tilting by negative angles clockwise, the possible switching point moves toward longer paths S because of the shift of the course of the flux density in the longitudinal direction y or along the movement path BB.

What is claimed is:

1. A displacement sensor arrangement for determining a current position of a moving body moving along a movement path in a vehicle, comprising:
 a magnet configured to generate, at least over a path of the moving body, a magnetic field having at least two mutually perpendicular components, one of which is perpendicular to the movement path;
 a magnetic angle sensor sensitive to at least two of the at least two mutually perpendicular components of the generated magnetic field, the magnetic angle sensor configured to span at least one measuring plane and to determine the current position of the moving body on the movement path as a function of respective value pairs of the at least two mutually perpendicular components; and
 a flux density sensor configured to detect an instantaneous value of one of the at least two mutually perpendicular components and to compare it with a threshold value to determine a switching point,
 wherein one of the magnet, the magnetic angle sensor, and the flux density sensor is configured to be connected to the moving body to move relative to another of the magnet, the magnetic angle sensor, and the flux density sensor, and
 wherein the switching point is defined by a common alignment of the magnetic angle sensor and of the flux density sensor with respect to the movement path.

2. The displacement sensor arrangement according to claim 1, wherein the magnetic angle sensor and the flux density sensor are arranged on a common circuit carrier and/or in a common component housing.

3. The displacement sensor arrangement according to claim 2, wherein the common circuit carrier and/or the common component housing is configured to be rotatable about an axis which corresponds to a normal of the at least one measuring plane of the magnetic angle sensor.

4. The displacement sensor arrangement according to claim 3, wherein a rotational position of the common circuit carrier and/or of the common component housing with respect to the movement path for defining the switching point is determined in advance.

5. The displacement sensor arrangement according to claim 1, wherein the at least two mutually perpendicular components of the respective value pairs is in each case determined differentially from two measured values which are detected by two measuring elements of the magnetic angle sensor which are spaced apart from one another spatially in a same spatial direction.

6. The displacement sensor arrangement according to claim 1, further comprising:
 a first microcontroller configured to (i) receive output signals of the magnetic angle sensor, (ii) convert them into corresponding magnetic angle values, and (iii) determine a position of the moving body for each magnetic angle value.

7. The displacement sensor arrangement according to claim 6, wherein the determination of the current position of the moving body is based on an arc tangent function or on an approximated arc tangent function of the at least two mutually perpendicular components.

8. The displacement sensor arrangement according to claim 6, wherein the flux density sensor is configured to detect an instantaneous value of an effective flux density and the displacement sensor arrangement further comprises:
 a second microcontroller configured to compare the instantaneous value of the effective flux density with the threshold value and to determine whether the switching point has been reached, the second microcontroller further configured to output at least one activation signal when the switching point has been reached.

9. The displacement sensor arrangement according to claim 8, wherein a first activation signal is configured to activate at least the first microcontroller as a wake-up signal.

10. The displacement sensor arrangement according to claim 1, wherein the movement path is a linear movement path that specifies a linear movement of the moving body or a circular movement path that specifies a circular movement of the moving body.

11. The displacement sensor arrangement according to claim 10, wherein the magnet includes at least two magnets defining magnetic axes having opposite directions.

12. The displacement sensor arrangement according to claim 11, wherein:
 the at least two magnets extend in a same linear direction, which extends parallel to the linear movement path or touches the circular movement path; and
 the at least two magnets are spaced apart from one another along the linear movement path or along a direction touching the circular movement path.

13. A displacement sensor arrangement according to claim 1, wherein the magnet has a special magnetization.

14. A vehicle with a braking system which includes a brake pedal, wherein a position of the brake pedal is determined by the displacement sensor arrangement of claim 1.

15. The vehicle according to claim 14, wherein a second activation signal is configured to activate a brake light function of the vehicle.

* * * * *